Dec. 6, 1938.  J. J. BOAX  2,139,067
CONTINUOUS HEATING FURNACE
Filed Feb. 11, 1937
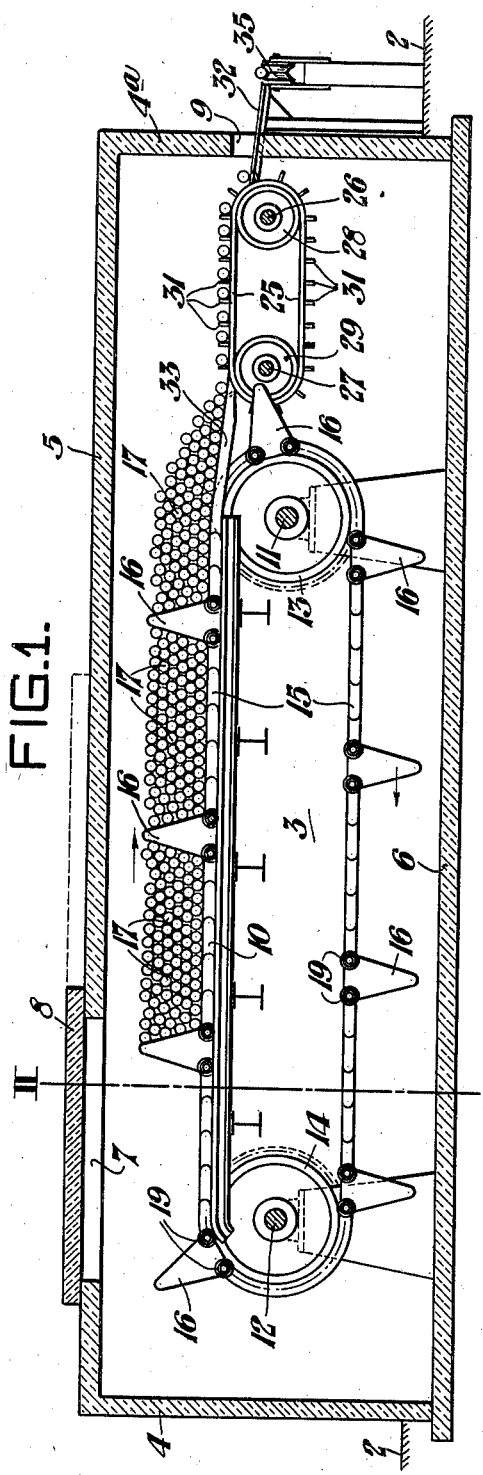
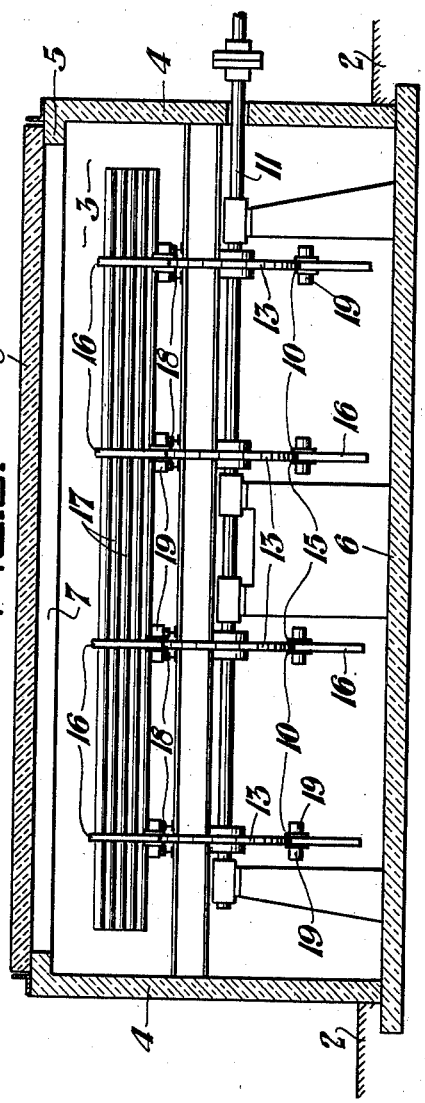
INVENTOR.
JOHN J. BOAX,
BY
HIS ATTORNEYS.

Patented Dec. 6, 1938

2,139,067

UNITED STATES PATENT OFFICE 2,139,067

CONTINUOUS HEATING FURNACE

John J. Boax, McKeesport, Pa., assignor to National Tube Company, a corporation of New Jersey Application February 11, 1937, Serial No. 125,325

3 Claims. (Cl. 263—8)

My invention relates to continuous heating furnaces and, more particularly, to those wherein pipes or tubes, or other tenuous articles, are heated during passage therethrough.

Continuous heating furnaces of the class described are usually constructed and arranged to receive the articles to be heated either singly or in pairs and to move them through the heating chamber at a speed correlated to the temperature thereof so that the article or articles will be delivered at the exit of the chamber at the desired temperature.

However, in order to heat the articles properly a very long heating chamber is required, or else the chamber must be maintained at extremely high temperature.

It is among the objects of the present invention to provide a relatively short continuous heating furnace which does not require extremely high temperature.

Another object is to provide a continuous heating furnace having the foregoing advantages which is particularly adapted for heating pipes or tubes or other elongated articles.

The foregoing and other objects will be apparent after referring to the drawing, in which:

Figure 1 is a longitudinal elevation of a device of the present invention; and

Figure 2 is a sectional view on the line II—II of Figure 1.

In the drawing, the numeral 2 designates a mill floor in which there is seated a heating chamber 3 which may be heated by any conventional means. The heating chamber 3 is enclosed by insulated walls 4, roof 5 and bottom 6, the latter preferably being below the level of the mill floor 2, as shown. The roof 5 has, adjacent one of its ends, a charging opening 7 extending across the width thereof and adapted to be closed by a sliding cover 8. A discharge port 9 is provided in the end wall 4ᵃ which is most remote from the charging opening 7 in the roof 5.

Disposed within the chamber 3 are a main conveyer 10 and a secondary or discharge conveyer 25. The main conveyer 10 is composed of a driveshaft 11 and an idle shaft 12, each of which carries a plurality of sprockets, as at 13 and 14, respectively. An endless link conveyer chain 15 is strung between each pair of sprockets 13 and 14, and each chain is provided with a plurality of outwardly extending fingers 16 which are suitably spaced and transversely aligned to receive a crane load 17 of pipes, tubes or other tenuous articles. A trackway 18 is disposed adjacent each side of each of the chains 15. These trackways 18 support rollers 19 which are connected at suitably spaced positions on each side of each of the chains 15; whereby the chains are relieved of the weight of the work-pieces.

A secondary conveyer 25 is disposed adjacent the sprockets 13 on the drive shaft 11. This secondary conveyer 25 is composed of a drive shaft 26 and an idle shaft 27 each of which carries a plurality of sprockets, as at 28 and 29, respectively. An endless link conveyer chain 30 is strung between each pair of sprockets 28 and 29, and each chain is provided with a plurality of outwardly extending fingers 31 which are suitably spaced and transversely aligned to carry between them a single pipe or tube or other tenuous article.

A rollerway 33 is disposed between the delivery end of the main conveyer 10 and the receiving end of the secondary conveyer 25, whereby work-pieces are introduced singly to the latter.

A skidway 32 is disposed between the delivery end of the secondary conveyer 25 and the discharge port 9 of the heating chamber 3 and introduces heated single work-pieces to a conveyer 35 immediately adjacent thereto.

In operation, a crane load or "lift" of pipes or tubes, etc., is delivered in bulk through the heating chamber charging opening 7 to the conveyer 10. The speed of the conveyer 10 is regulated so that a crane load of work-pieces are heated to approximately the desired temperature by the time they are delivered to the secondary conveyer 25 for delivery from the heating chamber 3. Thus, by providing a continuous heating furnace which receives articles in bulk and delivers them singly therefrom, it is possible to utilize a relatively short heating chamber which is economical to operate and conserves floor space.

A continuously heating furnace of this type has been found to be particularly useful for heating pipes or tubes prior to coating. Such heating materially reduces the time necessary for drying and oxidizing the coating after the coating operation.

While I have shown and described one specific embodiment of my invention, it will be understood that I do not wish to be limited exactly thereto, since various modifications may be made without departing from the scope of the invention as defined by the following claims.

I claim:

1. In a continuous heating furnace, a heating chamber, means for positively moving a body of closely assembled tenuous superposed articles through said chamber, and means for discharging said articles singly from said heating chamber.

2. In a continuous heating furnace, a heating chamber, a conveyer in said chamber, said conveyer being constructed and arranged to receive a body of closely assembled tenuous superposed articles and positively move the same through said chamber, and a second conveyer in said chamber, said second conveyer being constructed and arranged to receive said articles from said first conveyer and to discharge the same singly from said heating chamber.

3. In a continuous heating furnace, a heating chamber, said heating chamber having an opening adjacent one end of the roof thereof and a second opening in the end wall of said chamber remote from said roof opening, a conveyer in said chamber, said conveyer being constructed and arranged to receive a body of closely assembled tenuous superposed articles and positively move the same from adjacent said roof opening and toward and adjacent said end wall opening, a second conveyer disposed between said first-named conveyer and said end wall opening, said second conveyer being constructed and arranged to receive said articles from said first-named conveyer and discharge the same singly through said end wall opening.

JOHN J. BOAX.